United States Patent [19]

Giannuzzi

[11] Patent Number: 4,828,439
[45] Date of Patent: May 9, 1989

[54] SCREW ANCHOR

[76] Inventor: Louis N. Giannuzzi, 59 Dingletown Rd., Greenwich, Conn. 06830

[21] Appl. No.: 49,858

[22] Filed: May 15, 1987

[51] Int. Cl.$^4$ .................................. F16B 13/10
[52] U.S. Cl. ................................ 411/37; 411/38; 411/908
[58] Field of Search ............... 411/38, 34, 35, 36, 411/37, 340, 344, 345, 346, 71, 73, 908

[56] References Cited

U.S. PATENT DOCUMENTS

| | | | |
|---|---|---|---|
| 1,295,734 | 2/1919 | Greubel | 411/38 |
| 2,396,501 | 3/1946 | Gibson | 411/38 |
| 2,610,013 | 9/1952 | Gibson | 411/38 X |
| 3,143,916 | 8/1964 | Rice | 411/37 |
| 3,385,156 | 5/1968 | Polos | 411/37 |
| 3,888,156 | 6/1975 | Fima | 411/38 |
| 4,152,968 | 5/1979 | Lassine | 411/38 |
| 4,274,324 | 6/1981 | Giannuzzi | 411/386 X |

FOREIGN PATENT DOCUMENTS 8605847 10/1986 PCT Int'l Appl. ............... 411/340

Primary Examiner—Lloyd A. Gall
Assistant Examiner—Curtis B. Brueske
Attorney, Agent, or Firm—Michael Ebert

[57] ABSTRACT

A screw anchor including a four-legged compressible shank whose normal shape is diamond-like, the front legs of the shank being joined together by a front apex hinge, the rear legs being joined to the front legs by side apex hinges. The rear legs terminate in feet whose adjacent soles normally assume the form of an inverted V-inlet. A socket whose bore lies in axial registration with a hole in the front apex of the shank is secured by a pair of normally outstretched resilient webs to the respective rear legs. To install the anchor, its side apex hinges are manually compressed to collapse the shank into a tongue which is then inserted through a hole drilled in the wall until the socket is seated therein and the shank which is now behind the wall resumes its diamond-like shape. Then a screw for holding the fixture against the wall is inserted in the socket bore and turned therein until its tip is intercepted by the inlet which is dilated thereby to admit the screw. As the turning screw continues to advance, its crests engage the soles of the feet to force the rear legs apart and in doing so compels the shank to now assume a triangular shape. At the conclusion of screw advance, its tip is threadably received in the hole of the front apex to create behind the wall a triangular truss in which the screw forms a central strut.

7 Claims, 2 Drawing Sheets

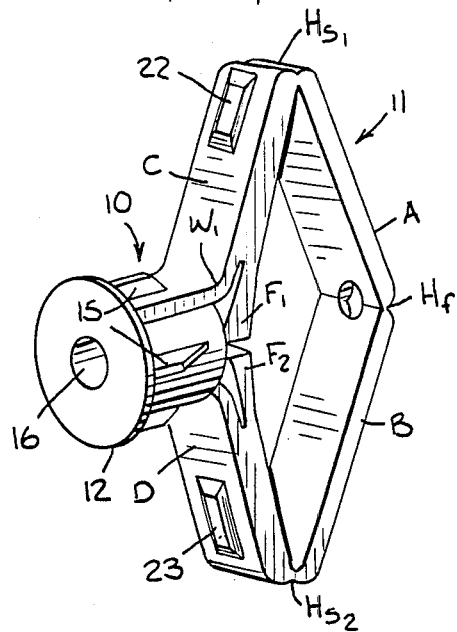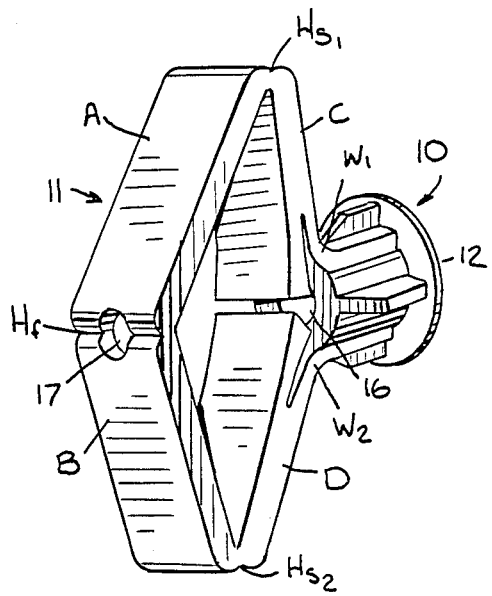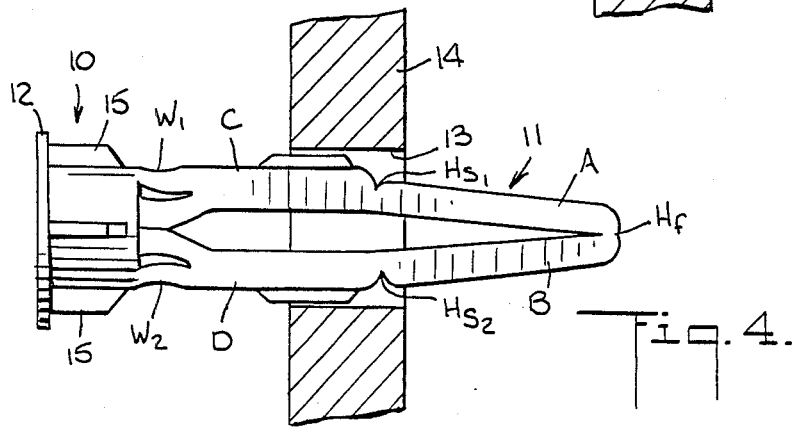

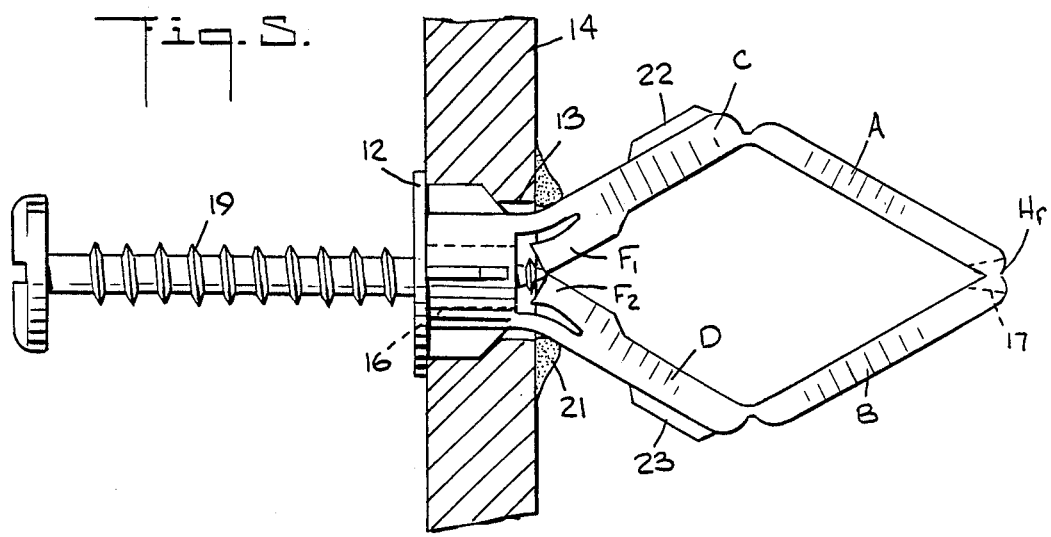
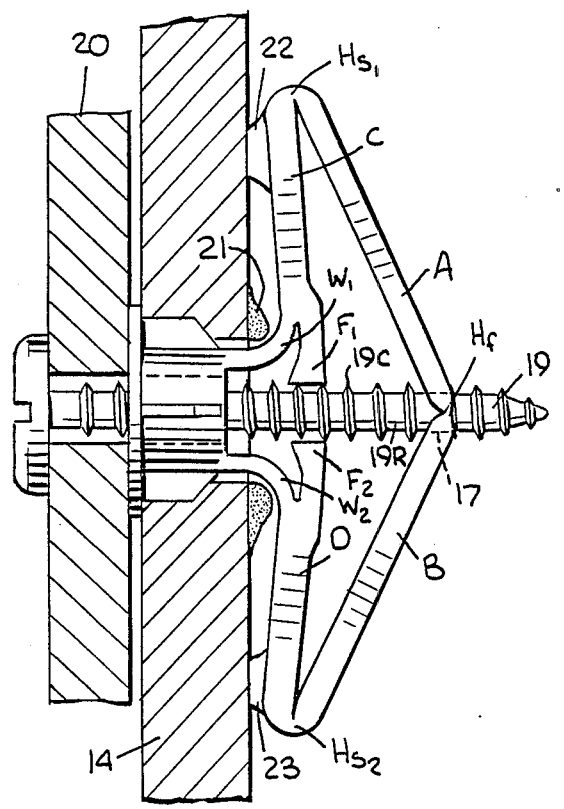
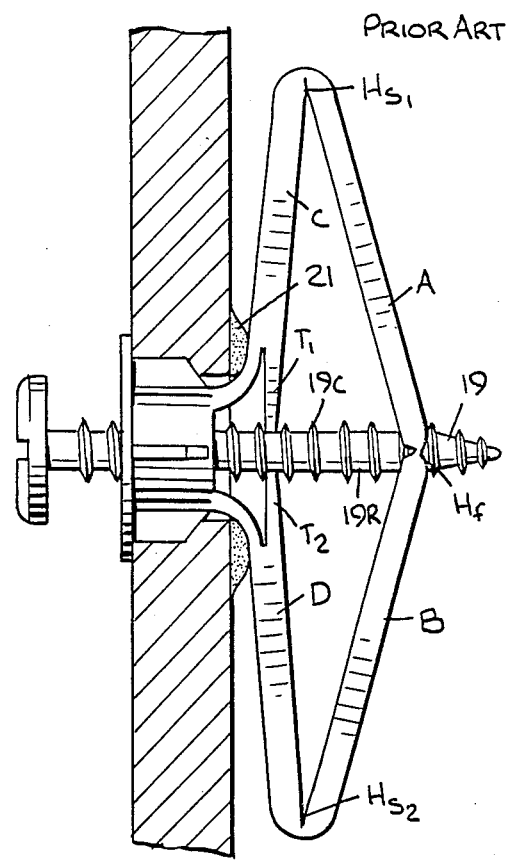

SCREW ANCHOR

BACKGROUND OF INVENTION

1. Field of the Invention

This invention relates generally to screw anchors for fastening fixtures and other objects against the outer surface of a hollow wall, and more particularly to a removable and reusable plastic screw anchor formed by a four-legged shank which normally assumes a diamond-like shape and is secured by resilient webs to a socket, the shank being collapsible to form a tongue that is insertable in a hole drilled in the wall to accommodate the socket into whose bore a fixture-holding screw is inserted which acts to transform the diamond-like shank behind the wall into a triangular truss.

2. Status of Prior Art

In hollow walls formed of plaster board, "Sheetrock," plywood and other relatively thin panel material, one is often faced with the problem of mounting on the wall drapery transverse rods, lighting fixtures and other objects which impose a heavy stress on the wall. Such walls are usually incapable of retaining standard screws, and it is for this reason that an anchor of some sort is required in order to secure a screw to the wall to afford a strong and reliable fixture installation.

The nature of the anchor must be such that it is adapted to engage the inner surface of the hollow wall so that the anchor cannot be pulled out and will not twist when the screw is inserted and taken up to secure the fixture to the wall.

One commonly used screw anchor makes use of a metal sleeve which is longitudinally split to create parallel ribs extending between a flanged front socket received in a hole drilled in the wall and a rear socket, the rear socket being threaded. The arrangement is such that when a screw is inserted to engage the rear socket, turning of the screw causes the ribs to deform and to flare out until they are drawn flush with the interior surface of the wall. The flating of the ribs spreads the load over a relatively wide area of the wall adjacent the hole drilled therein.

One major objection to a metal screw anchor of this type is that there is no efficient way of removing the anchor from the wall; for once the ribs are deformed to their flared condition, they cannot be straightened. Hence to remove the screw anchor, one must break the flange off the front socket and push the remainder of the screw anchor into the wall. This not only destroys the screw anchor so that it cannot be reused, but damage is often done to the wall in an attempt to remove the flange.

To overcome the drawbacks of conventional screw anchors, the patent to Kapnek, U.S. Pat. No. 3,487,746 discloses an anchor formed by parallel ribs which are pivotally secured to front and rear sockets, a spring causing the ribs to pivot and to be held tight against the interior of the wall. The anchor can be straightened out by the insertion of a screw to expand the spring, thereby permitting the withdrawal of the anchor from a hole made in the wall. While an anchor of this type is removable and reusable, its relatively complex structure makes the manufacture and assembly thereof expensive.

Dwyer, in his U.S. Pat. No. 3,213,746, discloses a less costly screw anchor which is molded of plastic material. The anchor includes a flexible web member with a wish-bone-like shape which, when a screw is inserted, spreads apart to hold the socket of the anchor in the wall. In this arrangement, the inner surface of the wall is engaged only by teeth formed on the sloped surfaces of the webs in a small area surrounding the hole, so that the load is concentrated in this area rather than over broad area required to distribute the load. Such load distribution is essential with relatively weak plaster board and the like; for otherwise a heavy load imposed on the anchor will pull the anchor out of the hole.

Still another approach is that disclosed in the McSherry U.S. Pat. No. 3,651,734 in which a screw socket received in the hole in the wall is coupled to a toggle lock. When collapsed, this toggle is insertable through the hole. When expanded to an over-center stable position, the toggle acts to lock the anchor within the hole. One serious drawback of this anchor arrangement is that once installed it cannot be easily removed.

Of greatest prior art interest is my U.S. Pat. No. 4,197,781 (1980) entitled "Screw Anchor." This patent discloses a removable and reusable plastic screw anchor for fastening fixtures and other objects to a hollow wall. The anchor includes a four-legged diamond-shaped shank whose front legs are joined together by a front apex hinge and whose rear legs are joined to the front legs by side apex hinges, the ends of the rear legs defining a rear apex. Secured by a pair of normally outstretched resilient webs to the rear legs of the shank is a flanged socket whose bore lies in registration with an opening formed in the front apex hinge. The diamond-shaped shank is collapsible to form a tongue that is insertable in a hole drilled in the wall to accommodate the socket, the webs then reverting to their outstretched condition to cause the shank which is now behind the wall to recover its diamond formation.

When a self-tapping screw is turned into the socket bore, it acts to thread the bore. As the screw proceeds beyond the bore to engage the tips at the rear legs of the shank, it acts to spread apart these rear legs and compel the shank to assume the configuration of a triangular truss. The bottom chord of the truss is defined by the rear legs and is pressed against the inner surface of the wall, the truss having a central strut formed by the screw when it extends between the front apex and the socket. To remove the anchor from the hollow wall, one simply withdraws the screw to permit collapse of the truss.

In the screw anchor disclosed in my prior patent, the ends of the rear legs which form the rear apex of the normally diamond-like shank are not interhinged but are disconnected. The tips of the rear legs are engaged by the point of the advancing screw which should then act to spread the legs to transform the diamond-shaped shank into triangular form. But in practice, this necessary transformation in certain circumstances does not take place at all or otherwise results in only a partial triangulation of the shank.

These circumstances sometimes arise when the installer drills a hole in plasterboard or other hollow wall material which is relatively fragile. Unless the drilling action is carried out with reasonable care, the plaster around the edge of the hole at the inner surface of the wall will disintegrate or shatter. As a result, a raised annular ridge or bump of plaster particles is developed around the hole edge. When the screw anchor is later inserted in this hole, the annular ridge surrounding the hole edge then may abut the resilient webs which join the socket to the rear legs of the shank and can act to resist spreading of the rear legs by the advancing screw and retard proper triangulation of the shank. Since the ridge is not uniform in shape but is usually irregular, the degree of resistance it offers and how it is distributed varies from hole to hole.

Because of the resistance to triangulation of the shank offered by the ridge surrounding the rear en of the drilled hole in the wall, three possible situations may arise with my prior patented screw anchor in which the ends of the rear legs terminate in tapered tips which define the rear apex of the shank. These tips are quite flexible and easily deflected; hence when the rear legs of the shank whose tips are supposed to cause triangulation meet resistance because of the ridge, the tips deflect, and in doing so fail to carry out their required function.

In the first possible situation in which the rear legs encounter resistance to normal displacement, when the fixture-holding screw is inserted in the socket bore and turned, the screw then first advances toward the flexible tips at the rear legs of the shank. These tips, whose axial displacement is resisted by the ridge then lie between the crests of the screw and engage the root thereof. The root diameter of the screw is substantially smaller than that of the crests; hence the extent to which the screw is then capable of forcing apart the rear legs and overcoming the resistance of the ridge is limited by the diameter of the root. As a result, the shank is only partially triangulated and does not provide a triangular truss whose bottom chord is pressed against the inner surface of the wall to attain maximum anchor holding power.

Moreover, in order for the screw to be effective in the first situation, its length must be sufficient to bridge the distance between the inner surface of the wall and the front apex of the partially triangulated shank to form the center shank of the truss. This screw length must be greater than the length that would be required had full triangulation occurred; for then the front apex of the shank would be brought closer to the rear surface of the wall.

Apart from the fact that a longer and hence a more expensive screw is required, is the fact that in many instances the depth of the hollow portion of the wall is insufficient to accommodate a longer screw.

A second situation that is sometimes encountered is one in which as the screw is advanced, because of the resistance offered by the ridge to normal triangulation, the tips of the rear legs are laterally deflected by the advancing screw and the entire screw then spirals between the rear legs, instead of pushing the rear legs axially forward. As a consequence, the shank behind the wall remains in its diamond-like shape and not even partial triangulation takes place, so that even when the screw is fully inserted in the socket, the installed anchor does not attain its full holding power.

Though in the second situation no triangular truss is formed to provide full holding power, the installer who cannot see behind the wall is then unaware that the installation is defective.

The third situation represents a worst case possibility; for instead of the tapered tips falling between the screw crests as in the first situation or being laterally deflected so that their sides lie flat against the screw crests as in the second situation, what now happens is that because of uneven resistance offered by the ridge around the drilled hole, one rear leg is engaged by the point of the screw and acts to triangulate this leg, while the other tip is laterally deflected and lies parallel against the screw. As a result, one rear leg of the shank is somewhat displaced by its tip which later engages the root of the screw, whereas the other rear leg whose tip is laterally deflected, is not displaced and the shank is then caused to assume a distorted diamond-like shape.

Because of the distorted diamond, the hole in the front apex is no longer in registration with the socket bore and the formation of a truss is no longer possible, for the tip of the advancing screw will now strike one of the front legs and will miss the front apex hole. Here again, though the installation is defective, the installer who cannot see behind the wall is unaware of this fact.

Under normal conditions, the rear legs of the triangulated shank form the chord of a triangular truss which is pressed along its entire length against the inner surface of the wall, so that the load is distributed over a broad area. But under those circumstances where a raised ridge surrounds the edge of the drilled hole at the inner surface of the wall, the center portion of the chord of the truss will be pressed against this ridge and the end portions of the truss which are farthest from the hole will then be disengaged from the wall; hence the load will be concentrated in the region surrounding the hole.

Because of the inherent weakness of plasterboard, this load concentration is undesirable; for with a heavy load, the anchor may rupture the plaster board in the hole region and be pulled out of the wall by the load. Thus even when proper triangulation has occurred with my prior patented anchor, its full holding power is not attained.

This does not mean that my prior screw anchor is ineffective—for tens of millions have already been put to successful use—but only to the extent there is a build-up of plaster particles or other material in the region surrounding the edge of the hole—and this depends on the care exercised by the installer and the quality of the drill used to form the hole—this build-up militates against the proper function of the screw anchor.

SUMMARY OF INVENTION

In view of the foregoing, the main object of this invention is to provide an improved screw anchor which is molded or otherwise formed of synthetic plastic material, the anchor being removable from the wall in which it is installed.

More particularly, an object of the invention is to provide a screw anchor which includes a four-legged diamond-like shank whose rear legs are secured by resilient webs to a socket having a bore therein whereby when a screw is inserted in the bore and advanced toward the front apex of the shank, it engages the ends of the rear legs to force them apart to fully transform the shank into a triangular form.

A significant advantage of the invention is that the screw required need not be much longer than is necessary to reach the front apex of the triangular truss, thereby making it possible to use shorter screws than those required by my prior screw anchor.

Also an object of the invention is to provide a screw anchor whose truss may be quickly collapsed by removing the screw therefrom to permit easy removal of the anchor from the hollow wall without in any way doing damage thereto.

Still another object of the invention is to provide a plastic screw anchor which is capable of supporting a substantial load on a hollow wall and which may be mass-produced at low cost.

Briefly stated, these objects are attained in a screw anchor for fastening fixtures and the like against the outer surface of a hollow wall. The anchor includes a four-legged compressible shank whose normal shape is diamond-like, the front legs of the shank being joined together by a front apex hinge, the rear legs being joined to the front legs by side apex hinges. The rear legs, which are unjoined at a rear apex of the shank, terminate in feet whose adjacent soles normally assume the form of an inverted V-inlet. A socket having a bore therein which is in axial registration with a hole in the front apex is secured by a pair of normally outstretched resilient webs to the respective rear legs of the shank at a point thereon outward of the feet.

To install the anchor, its side apex hinges are manually compressed to collapse the shank into a tongue which is then inserted through a hole drilled in the wall until the socket is seated therein and the shank which is now behind the wall resumes its diamond-like shape. Then a screw for holding the fixture against the wall is inserted through the socket bore and turned therein until its tip is intercepted by the inlet which is dilated thereby to admit the screw. As the turning screw continues to advance, its crests engage the soles of the feet and force the rear legs apart, and in doing so, compel the shank to now assume a triangular shape. At the conclusion of screw advance, the tip of the screw is threadably received in the front apex hole to create behind the wall a triangular truss in which the screw forms a central strut. The rear legs are provided with load distribution pads which when the truss is formed engage the inner surface of the wall to enhance the holding power of the truss.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective front view of a screw anchor in accordance with the invention as seen looking toward its socket;

FIG. 2 is a perspective rear view of the same screw anchor as seen looking toward its shank;

FIG. 3 illustrates how the anchor is collapsed to permit its insertion through a drilled hole in a hollow wall;

FIG. 4 shows the collapsed anchor being inserted through the drilled hole;

FIG. 5 shows the anchor after insertion in a drilled hole, with its shank in a diamond-like shape and with the screw about to engage the inlet defined by the feet terminating the rear legs of the shank;

FIG. 6 shows the fully installed anchor; and

FIG. 7 shows, for purposes of comparison, an installed prior art anchor.

DESCRIPTION OF INVENTION

Referring now to FIGS. 1 and 2, there is shown a preferred embodiment of a screw anchor in accordance with the invention, the anchor being molded or otherwise fabricated of a resilient synthetic plastic material such as polypropylene, nylon or any other material which has acceptable structural characteristics. The anchor is constituted by a socket, generally designated by numeral 10, and a compressible shank, generally designated by numeral 11.

The front face of socket 10 is provided with a circular flange 12 whose diameter is greater than that of the body of the socket. Thus when the socket is seated within a hole 13 drilled in a hollow wall 14, as shown in FIG. 5, whose diameter is sufficient to accommodate the body of the socket, flange 12, then rests against the outer surface of the wall so that the socket cannot be pushed through the hole.

Socket 10 is provided with a set of four sharp fins 15 at 90 degree positions, the fins having sloping cutting edges such that when the socket is pushed into a drilled hole in a plaster or similar hollow wall, the fins cut into the plaster surrounding the hole to stabilize the socket and prevent rotation thereof. Socket 10 includes a longitudinal bore 16 adapted to receive a self-tapping screw in a manner to be later described.

Shank 11 is formed by a pair of front legs A and B which are hingedly joined to a pair of rear legs C and D. These legs assume a diamond-like shape in the normal state of the shank. By "normal state" is meant the state of the anchor as it leaves the factory, the anchor being in this state in the hands of the installer before installation thereof. Front leg A is connected to front leg B by a front apex hinge $H_f$ having an opening 17 therein which lies in axial registration with bore 16 in socket 10. Front legs A and B are hingedly joined to rear legs C and D, respectively, by side apex hinges $H_{s1}$ and $H_{s2}$. These three hinges are preferably in the form of living hinges integral with the plastic legs of the shank.

The rear legs C and D, which are unjoined, terminate in relatively inflexible and thick feet $F_1$ and $F_2$, respectively, whose flat soles define an inverted-V inlet which constitutes the rear apex of the diamond-like shank. This inlet is in axial alignment with the bore 16 of socket 10.

Socket 10 is attached to shank 11 by a pair of normally outstretched resilient webs $W_1$ and $W_2$ which are integral with rear legs C and D and merge therewith at a point removed from the free ends of those legs which are in a foot formation. Resilient webs $W_1$ and $W_2$ normally maintain the shank erect to assume the normal diamond-like configuration shown in FIGS. 1 and 2. But because the legs of the shank are hinged together, the shank is collapsible and it becomes possible to compress the shank by squeezing it with the fingers. This is done, as shown in FIG. 3, by applying finger pressure at the side apex hinges $H_{s1}$ and $H_{s2}$ in opposing directions as indicated by the arrows. This acts to flatten out the legs and thereby create a tongue, as shown in FIG. 4, making it possible to insert the shank in hole 13 drilled in wall 14.

When a self-tapping screw 19, as shown in FIG. 5, is turned into bore 16 of socket 10 to secure a bracket, a fixture or any other object to the outer surface of hollow wall 14, screw 19 first acts to thread the bore. As the installer continues to turn in the screw, its tip is intercepted by the inverted V-shaped inlet defined by the flat soles of feet $F_1$ and $F_2$ and the inlet is dilated to admit the screw. As the turning screw continues to advance, its crests then engage the soles of the feet and act to spread the feet apart.

The diameter of crest 19C is significantly greater than that of the root 19R of the screw. The space between successive convolutions of the thread of the screw is smaller than the longitudinal dimension of the foot sole so that the sole straddles at least two successive crests 19C and therefore cannot fall between the crests. Hence when the screw passes through the inlet and its crests engage the soles of feet $F_1$ and $F_2$, it forces the feet apart, and in doing so, compels the diamond-like shank to undergo transformation into the triangular shank shown in FIG. 6.

This full triangulation takes place when the screw is first interposed between the soles of the feet and well before the advancing tip of the screw reaches the front apex hinge Hf. Hence the length of the screw need not be much longer than the distance between the vertex of the triangle and its base. The necessary screw length must, of course, also take into account the thickness of fixture 20 to be fastened by the anchor.

As the screw continues to advance, its tip enters and threads hole 17 in the front apex hinge Hf to define a central strut or beam extending between the front apex and the socket at the midpoint of the chord of a triangular truss, this chord being defined by rear legs C and D which are pressed against the inner surface of the wall. This produces a truss of high strength which imparts exceptional holding power to the screw anchor and renders it capable of sustaining heavy loads.

As noted previously, in some instances, an annular ridge of broken plaster particles may be developed around the edge of the hole at the inner surface of the wall, as represented by ridge 21 in FIGS. 5 and 6. This ridge abuts the resilient webs $W_1$ and $W_2$ of the anchor and therefore resists the flexing of the webs which takes place in the course of shank transformation from a diamond-like to a triangular shape. However, because the feet $F_1$ and $F_2$ of the shank are relatively inflexible and are forced apart by the advancing screw, this compels the rear legs C and D to apply a strong bending force to the webs which overcomes the resistance offered by the ridge. Hence the shank is caused to assume the form shown in FIG. 6 in which the ridge in the region surrounding the hole now underlies the outstretched rear legs C and D and therefore prevents these legs from fully engaging the inner surface of the wall.

The adverse effects resulting from the presence of ridge 21 on a prior type of anchor of the type disclosed in my U.S. Pat. No. 4,197,781 is shown in FIG. 7, where it will be seen that this anchor has rear legs C and D which terminate in tapered tips $T_1$ and $T_2$. These fall between the crests 19C of screw 19 and engage the root 19R of the screw so that the screw only partially triangulates the shank when the tips are displaced thereby, as in the first situation described in the Background Section. And because of ridge 21, the load is concentrated in the region around the hole, for this is the only region in which the chord of the truss is pressed against the inner surface of the wall, so that even when the tip of screw 19 enters the front apex hinge hole HF to draw this apex toward the wall, full triangulation is still not achieved.

With the present invention, the ridge creates a similar problem. To overcome this problem, the rear legs are provided adjacent the side apex hinges with load distribution blocks 22 and 23 which are integrated with these legs and bear against the inner surface of the walls. In this way, the load is largely imposed in a region well beyond the hole region, thereby greatly enhancing the load bearing capacity of the anchor.

A screw anchor in accordance with the invention is preferably fabricated by low-cost injection molding techniques. For this purpose, use is preferably made of a mold whose configuration produces an anchor in which the rear legs C and D of the shank are folded to form swept back wings, so that the webs $W_1$ and $W_2$ which connect the socket to the shank are then reversely curved. Then in a separate operation after molding is completed, the shank is reshaped to cause it to assume the desired diamond-like shape in which the webs are outstretched, this being the manufactured shape of the screw anchor and the form in which it is made available to installers.

Because legs C and D are molded in this fashion, the plastic memory required of webs $W_1$ and $W_2$ is reduced, so that when the anchor shank is later caused to assume a tongue formation for hole insertion, in which condition the webs are flexed to take on a straight form and the tongue is thereafter released when it passes beyond the hole, the shank, because of the memory of the webs, will then recover its normal diamond-like shape.

While there has been shown and described a preferred embodiment of a hollow wall anchor in accordance with the invention, it will be appreciated that many changes and modifications may be made therein without, however, departing from the essential spirit thereof. Thus, while the anchor has been described in connection with a self-tapping screw, in practice an ordinary screw may be used in conjunction with a threaded bore. And in practice, the side hinges may be frangible so that the front legs of the shank may be ripped off and the rear legs used as the shank of a screw anchor for solid wall installations as described in my prior patent.

I claim:

1. A screw anchor for holding a fixture or other object against the outer surface of a hollow wall and constituted by a compressible anchor molded of synthetic plastic material and a screw cooperating with the anchor, said anchor comprising:

A. a four-legged shank whose normal shape is diamond-like, said shank having a pair of front legs joined together by a front apex living hinge having a hole therein, and a pair of rear legs joined by side living hinges to the front legs, the rear legs terminating in feet forming the rear apex of the shank, said feed being relatively inflexible and having substantially flat soles which when the shape of the shank is diamond-like define an inverted V-inlet;

B. a socket having a bore therein which lies in axial registration with the front apex hole; and C. a pair of normally outstretched resilient webs securing said socket to the respective rear legs of the shank at a point thereon outward of said feet, whereby when the shank is manually compressed at the side hinges, the shank is collapsed to form a tongue which is insertable through a hole drilled in the wall until the socket is seated therein and the shank which is then behind the wall recovers its diamond-like shape, the screw when thereafter inserted in the socket bore and as it is turned in it advances toward the apex hole, in the course of which advance its tip is intercepted by the inlet to initiate triangulation of the shank, the inlet then being dilated to admit the advancing screw whose crests then engage the soles of the feet to force the rear legs apart and compel the shank to now assume a triangular shape in which the soles of the feet are in substantially parallel relation and abut the screw, each sole having a length sufficient to straddle adjacent crests of the screw whereby the soles engaging the crests are spaced from the root of the screw, the tip of the screw at the conclusion of its advance being threadably received in the front apex hole to create behind the wall a triangular truss in which the screw forms a central strut.

2. A screw as set forth in claim 1, further including load distribution blocks on the outer surface of said rear legs at a position thereon adjacent said side hinges to bear against the inner surface of the wall when a truss is formed, whereby the load produced by the fixture or object is largely imposed on a region of the wall well beyond the region surrounding the drilled hole to enhance the load bearing capacity of the anchor.

3. A screw anchor as set forth in claim 1, wherein said screw has a length sufficient to reach the front apex hinge when the shank is in a triangular shape.

4. A screw anchor as set forth in claim 1, wherein said socket is provided with fins which penetrate the wall of the drilled hole to prevent rotation of the anchor when the screw is turned.

5. A screw anchor as set forth in claim 6, wherein said socket is provided with a flange which lies against the outer surface of the wall when the socket is seated in said drilled hole.

6. A screw anchor as set forth in claim 1, wherein said feet are relatively thick and inflexible.

7. A screw anchor as set forth in claim 1, wherein said screw is a self-tapping screw, and said socket bore is threaded thereby.

* * * * *

UNITED STATES PATENT OFFICE
CERTIFICATE OF CORRECTION

Patent No. 4,828,439          Dated May 9, 1989

Inventor(s) Louis N. Giannuzzi

It is certified that error appears in the above-identified patent and that said Letters Patent is hereby corrected as shown below:

Column 8, line 41, "feed" should have read --feet--.

Signed and Sealed this

Seventeenth Day of October, 1989

*Attest:*

DONALD J. QUIGG

*Attesting Officer*          *Commissioner of Patents and Trademarks*